(No Model.)
G. S. STRONG.
PURIFYING FEED WATER.
No. 273,778.  Patented Mar. 13, 1883.
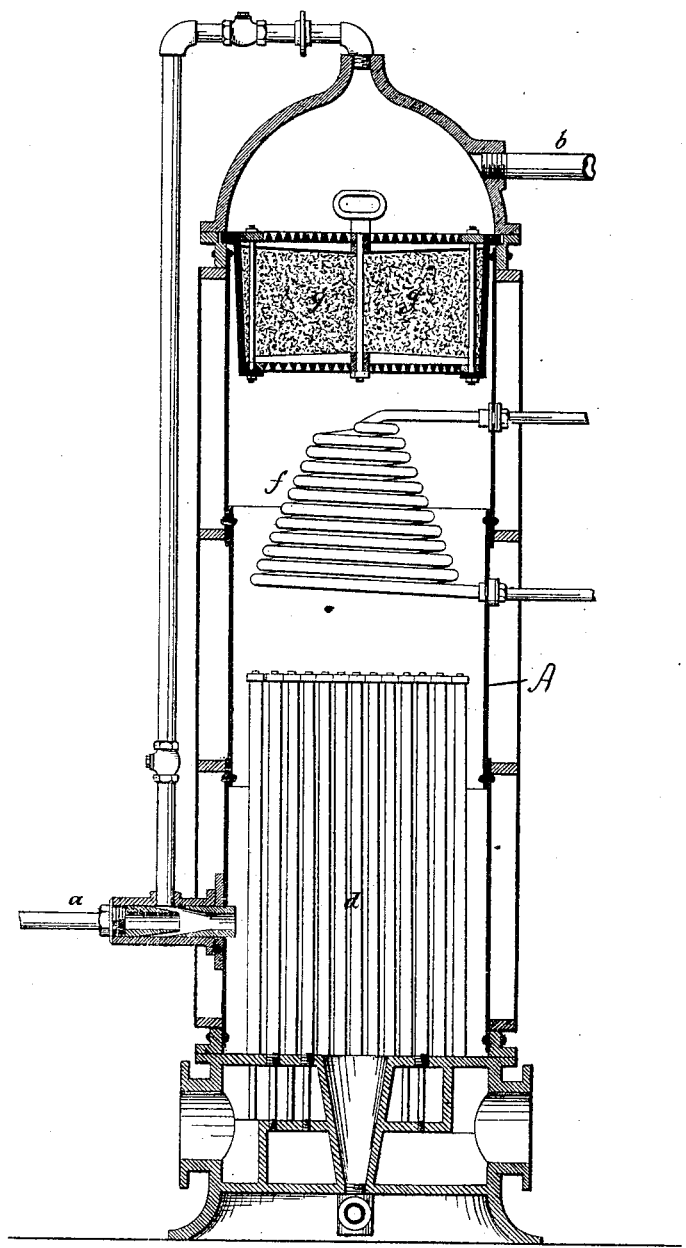
Witnesses.
Harry Drury
Hamilton Turner.
Inventor:
George S. Strong
by his Attorneys
Howson and Jones

UNITED STATES PATENT OFFICE.

GEORGE S. STRONG, OF PHILADELPHIA, PENNSYLVANIA.

PURIFYING FEED-WATER.

SPECIFICATION forming part of Letters Patent No. 273,778, dated March 13, 1883.

Application filed April 1, 1882. (No model.)

*To all whom it may concern:*

Be it known that I, GEORGE S. STRONG, a citizen of the United States, and a resident of Philadelphia, Pennsylvania, have invented an Improvement in Purifying Feed-Water, of which the following is a specification.

The object of my invention is to remove from water such impurities as carbonates of lime and magnesia and sulphate of lime, the water being thus rendered unobjectionable for use as feed-water for steam-boilers or for other purposes. When water containing such salts as those above mentioned is subjected to a high temperature the said salts are converted into insoluble particles, which are held in suspension in the water, and can therefore be separated therefrom while the water is kept at this temperature.

In carrying out my invention, therefore, I first heat the water to a temperature of about 250° Fahrenheit, thereby effecting the conversion of the salts into insoluble particles, as above described, the water, while so heated, being then passed through a filter, by which the insoluble particles held in suspension in the water are retained.

I have used in practice, in carrying out my invention, apparatus such as that shown in the drawing, said apparatus comprising a casing, A, with inlet $a$, outlet $b$, exhaust-steam-heated pipes $d$, live-steam coil $f$, and filter $g$, the water first coming into contact with the pipes $d$, then with the coil $f$, and finally passing through the filter. This apparatus, however, is not absolutely necessary to the carrying out of my invention, as various plans may be resorted to for raising the temperature of the water to the necessary degree before filtration, or in some cases a chamber in which the impurities can settle may take the place of filtration, as a means of separating from the heated water the insoluble particles held in suspension therein. Filtration is preferable, however, for obvious reasons.

The means employed for heating the water should be such that the metallic surfaces will not be heated to a much higher temperature than the water, so as to prevent the otherwise possible formation of scale on said metallic surfaces. A lower temperature than 250° Fahrenheit—in fact, a temperature not much above the boiling-point—is sufficient to convert the carbonates into insoluble particles; but the thorough conversion of all of the sulphate of lime held in solution by the water requires a temperature of about 300° Fahrenheit. Chemically pure water, however, is so very seldom required, especially for such purposes as feed-water, &c., that this extreme temperature will not generally be necessary; and I have found in practice that a temperature of about 250° Fahrenheit renders insoluble so much of the sulphate of lime present in the water that the quantity remaining in solution is not practically objectionable.

I claim as my invention—

The within-described process of removing from water those salts of lime and magnesia which are rendered insoluble at temperatures above the boiling-point of water, said mode consisting in raising the temperature of the water under pressure to such a degree as to convert the salts into insoluble particles, and separating said insoluble particles from the water while it remains under pressure and at a high temperature, all substantially as specified.

In testimony whereof I have signed my name to this specification in the presence of two subscribing witnesses.

GEO. S. STRONG.

Witnesses:
HARRY DRURY,
HARRY SMITH.